United States Patent [19]  [11]  4,087,377
Fujioka et al.  [45]  May 2, 1978

[54] REGENERATION OF ACTIVATED CHARCOAL CATALYST USED IN SULFURYL FLUORIDE PRODUCTION

[75] Inventors: George S. Fujioka, Walnut Creek; Jim Love; Russel R. Peterson, both of Concord, all of Calif.

[73] Assignee: The Dow Chemical Company, Midland, Mich.

[21] Appl. No.: 752,701

[22] Filed: Dec. 20, 1976

[51] Int. Cl.² ........................ B01J 21/20; C01B 17/45
[52] U.S. Cl. .................................... 252/415; 423/468
[58] Field of Search ............................ 252/415, 411 S; 423/468

[56] References Cited

U.S. PATENT DOCUMENTS

| | | | |
|---|---|---|---|
| 4,003,984 | 1/1977 | Jones et al. | 423/468 |
| 4,032,474 | 6/1977 | Goodraam et al. | 252/441 |

Primary Examiner—Winston A. Douglas
Assistant Examiner—P. E. Konopka
Attorney, Agent, or Firm—Gary D. Street

[57] ABSTRACT

A method of regenerating the activated charcoal catalyst used in the production of sulfuryl fluoride by reaction of sulfur dioxide, chlorine and hydrogen fluoride, comprising treating the spent catalyst with an anhydrous stream of hydrogen fluoride at about 350° to about 600° C.

9 Claims, No Drawings

REGENERATION OF ACTIVATED CHARCOAL CATALYST USED IN SULFURYL FLUORIDE PRODUCTION

BACKGROUND OF THE INVENTION

Sulfuryl fluoride ($SO_2F_2$) is a well-known fumigant which is prepared by the reaction of sulfur dioxide ($SO_2$), chlorine ($Cl_2$) and hydrogen fluoride (HF) at elevated temperatures over an activated catalyst. See U.S. Pat. No. 3,092,458, and 2,772,144. In the processes of the type disclosed in these patents, high yields of good quality $SO_2F_2$ readily obtainable at the outset of such operations. However, apparently as the result of side reactions, the activated carbon catalyst becomes rapidly poisoned, resulting in commercial disadvantages such as short catalyst life, low weight recovery of $SO_2F_2$ per weight unit of catalyst used and rapid decrease of product yield and quality as the poisoning of the catalyst progresses.

U.S. Pat. No. 3,320,030 discloses that a mixture of activated charcoal and an alkali metal bifluoride effectively catalyzes the reaction and does not poison as quickly as the activated charcoal alone. This catalyst system appears to be effective; however, it suffers from the disadvanages that material still must be removed from the reactor and replaced with fresh catalyst every 60 to 100 hours of operation or else regenerated. This is a slow process as the reactor has to be cooled and the spent catalyst, which contains considerable corrosive HF, is difficult to handle and dispose.

An alternative method of increasing catalyst life is regeneration. The standard method of regenerating an activated charcoal catalyst by partial oxidation with high temperature steam, has the disadvantage of eventually destroying the catalyst both by direct oxidation and degradation of the catalyst particles into fines.

Another method for regenerating the activated charcoal catalyst is disclosed in U.S. Pat. No. 3,714,336 and involves reducing the spent catalyst with a hydrogen stream at 400°–800° C. However, such method has the disadvantage of the need to purge the catalyst prior to and after regeneration with hydrogen and to scrub the vented hydrogen gas to remove HF and other by-products therefrom prior to release.

It would thus be desirable and it is an object of the present invention to provide a new method for the regeneration of the activated charcoal catalyst used in the reaction of $SO_2$, $Cl_2$, and HF to produce $SO_2F_2$ which obviates the disadvantages of the prior art.

An additional object is to provide such a method which preserves the catalyst structure and strength while yielding a regenerated catalyst which has improved activity and cycle life.

SUMMARY OF THE INVENTION

The invention is a method for regenerating the activated charcoal catalyst used in the reaction of $SO_2$, $Cl_2$ and HF to produce $SO_2F_2$. The method involves contacting the catalyst with a stream of anhydrous HF at a temperature of from about 350° to about 600° C. for a period of from about 0.5 to about 24 hours at pressures of from 1 to about 35 psig.

DESCRIPTION OF PREFERRED EMBODIMENTS

The regeneration is carried out within the operable temperature range of from about 350° to about 800° C. and preferably at a temperature within the range of from about 350° to about 600° C. In a highly preferred embodiment, the regeneration is carried out at temperatures of from about 450° to about 550° C., most preferably at about 490° to about 510° C. While a substantially pure stream of anhydrous HF is preferred, regenerant streams containing from about 80% or more HF in an inert diluent may be employed. The actual HF feed rate for regeneration purposes is not critical, normally about 3-4 lb moles/hr/500 lb. of catalyst or more are sufficient. Those skilled in the art will be able to readily determine the necessary rate based on reactor size, catalyst amount, HF purity, etc.

The time required for regeneration will vary inversely with the temperature and HF feed rates. While some regeneration takes place almost immediately, usually about 0.5 hour is required for any substantial regeneration. The maximum regeneration time is not critical, however, and regeneration times of from about 0.5 to about 24 hours are usually sufficient. The preferred regeneration time is as short as possible. Preferably, the regeneration time is from about 1 to about 4 hours, with a regeneration time period of from about 2 to about 4 hours being particularly preferred at temperatures of about 500° C. Regeneration is carried out following a production run for $SO_2F_2$, the duration of which is usually determined by reduced $SO_2F_2$ production and/or the presence of more than about 5000 ppm $Cl_2$ in the product.

The regeneration process disclosed herein provides several advantages over the prior art processes set forth herein, the most significant advantage residing in the fact that the regenerated catalyst can be placed back into production immediately after cooling, with no further treatment necessary. With hydrogen-regenerated catalyst, it is necessary to purge the reactor with nitrogen prior to and after regeneration with hydrogen. However, despite this, corrosion problems associated with "wet" hydrogen are still encountered. In comparison, the instant process does not require such purging with nitrogen or the use of additional equipment (driers, etc.). Additionally, the need to scrub the used $H_2$ regenerant to remove HF contaminant (present in the catalyst) prior to venting the $H_2$ is avoided by the present process as HF is one of the reactants used in preparing $SO_2F_2$. Finally, the use of HF as a catalyst regenerant enhances the yield of $SO_2F_2$ product per unit of catalyst employed.

The invention is further illustrated by the following examples:

EXAMPLE 1

Regeneration of PCB carbon catalyst (4-10 mesh), the effectiveness of which had become diminished in a production run as determined by reduced flow of $SO_2F_2$ product (prepared by reacting HF (4.5 moles), $SO_2$ (1.3 moles) and $Cl_2$ (1.0 mole) at 160°–210° C.) and free chlorine content was carried out with HF catalyst regenerant. In such operations, a 525 lb. charge of spent catalyst packed in 55 reactor tubes (each 2 inches in diameter and 20 feet long) was treated after each production run by passing an anhydrous stream of 100% HF through the catalyst at a pressure of about 30 psig, a temperature of about 500° C. and a feed rate of about 10 lb moles/hr/500 lb catalyst for a total period of about 4 hours. The treated catalyst was then cooled to the operating temperature for $SO_2F_2$ production and the production of $SO_2F_2$ was commenced without further treatment of the catalyst.

In several such $SO_2F_2$ production runs (17), the number of pounds of product produced per pound of catalyst was found to average 51.8 lbs. of $SO_2F_2$ product per pound of HF regenerated catalyst, despite trouble with a $Cl_2$ feed controller during several of the runs which, thus, prematurely caused deactivation of the catalyst. A total of 880 lbs. of $SO_2F_2$ were produced before the reactor was shut down due to unrelated distillation column problems. Examination of the reactor during the shut-down revealed little or no corrosive damage normally associated with $H_2$ regeneration.

EXAMPLE 2

The procedure of Example 1 about was repeated using $H_2$ (at a feed ratio of about 80–100 mols per hour) to regenerate 525 lbs. of spent catalyst at 500° C. for 4 hours. Prior to and after the regeneration, the reactor was purged with nitrogen before the $H_2$ regenerated catalyst was employed in $SO_2F_2$ production. The hydrogen regenerant used was scrubbed to remove HF therefrom before being vented.

Results from 30 $SO_2F_2$ production runs with the $H_2$ regenerated catalyst indicated an average product yield of 31.3 lbs. of $SO_2F_2$ per pound of catalyst employed, a total of about 939 lbs. of $SO_2F_2$ being obtained. The catalyst was then discarded as its reactor life had reached termination.

The foregoing data indicate the HF regenerated catalyst to be more effective in $SO_2F_2$ production than $H_2$ regenerated catalyst. Data from additional runs with HF regenerated catalyst are indicative of longer catalyst life and enhanced $SO_2F_2$ yield per unit of catalyst employed.

We claim:

1. A method for regenerating the activated charcoal catalyst used in the preparation of sulfuryl fluoride by reaction of sulfur dioxide, chlorine and hydrogen fluoride which comprises contacting the catalyst with a stream of anhydrous hydrogen fluoride at a temperature of from about 350° to about 800° C.

2. The process of claim 1 wherein the temperature is from about 350° to about 600° C.

3. The process of claim 1 wherein the temperature is from about 490° to about 510° C.

4. The process of claim 1 wherein the catalyst and hydrogen fluoride are contacted for a period of from about 0.5 to about 24 hours.

5. The process of claim 1 wherein the catalyst and hydrogen fluoride are contacted for a period of from about 1 to about 4 hours.

6. The process of claim 2 wherein the catalyst and hydrogen fluoride are contacted for a period of from about 1 to about 4 hours.

7. The process of claim 3 wherein the catalyst and hydrogen fluoride are contacted for a period of from 1 to about 4 hours.

8. The process of claim 1 wherein the catalyst and hydrogen fluoride are contacted for a period of from about 2 to about 4 hours at a temperature of about 500° C.

9. The process of claim 1 wherein the temperature is from about 450° to about 550° C.

* * * * *